United States Patent
Wachi et al.

(10) Patent No.: US 12,443,678 B2
(45) Date of Patent: Oct. 14, 2025

(54) STEPWISE UNCERTAINTY-AWARE OFFLINE REINFORCEMENT LEARNING UNDER CONSTRAINTS

(71) Applicant: INTERNATIONAL BUSINESS MACHINES CORPORATION, Armonk, NY (US)

(72) Inventors: Akifumi Wachi, Tokyo (JP); Takayuki Osogami, Yamato (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 973 days.

(21) Appl. No.: 17/551,708

(22) Filed: Dec. 15, 2021

(65) Prior Publication Data

US 2023/0185881 A1   Jun. 15, 2023

(51) Int. Cl.
*G06K 9/62*      (2022.01)
*G06F 18/21*     (2023.01)
(Continued)

(52) U.S. Cl.
CPC ............. *G06F 18/217* (2023.01); *G06N 3/04* (2013.01); *G06N 5/048* (2013.01)

(58) Field of Classification Search
CPC ......... G06F 18/217; G06N 3/04; G06N 5/048
See application file for complete search history.

(56) References Cited

U.S. PATENT DOCUMENTS

| | | |
|---|---|---|
| 2017/0032245 A1 | 2/2017 | Osband et al. |
| 2019/0332110 A1 | 10/2019 | Isele et al. |

(Continued)

FOREIGN PATENT DOCUMENTS

| | | |
|---|---|---|
| CN | 113538910 A | 10/2021 |

OTHER PUBLICATIONS

Bohez et al., "Success at Any Cost: Value Constrained Model-Free Continuous Control," publicly available via OpenReview.net on Sep. 27, 2018, ICLR 2019 submission, OpenReview ID: rJ1J-2CqtX, https://openreview.net/forum?id=rJ1J-2CqtX, Accessed Apr. 16, 2025 (Year: 2019).*

(Continued)

*Primary Examiner* — David Yi
*Assistant Examiner* — Paul Coleman
(74) *Attorney, Agent, or Firm* — Tutunjian & Bitetto, P.C; Robert Richard Aragona

(57) ABSTRACT

A computer-implemented method is provided for offline reinforcement learning with a dataset. The method includes training a neural network which inputs a state-action pair and outputs a respective Q function for each of a reward and one or more safety constraints, respectively. The neural network has a linear output layer and remaining non-linear layers being represented by a feature mapping function. The training includes obtaining the feature mapping function by constructing Q-functions based on the dataset according to an offline reinforcement algorithm. The training further includes tuning, using the feature mapping function, a weight between the reward and the one or more safety constraints, wherein during the obtaining and the tuning steps, an estimate of a Q-function is provided by subtracting an uncertainty from an expected value of the Q-function. The uncertainty is a function to map the state-action pair to an error size.

25 Claims, 10 Drawing Sheets

(51) Int. Cl.
*G06N 3/04* (2023.01)
*G06N 5/04* (2023.01)
*G06N 5/048* (2023.01)

(56) References Cited

U.S. PATENT DOCUMENTS

2020/0127913 A1  4/2020  Filsfils et al.
2020/0410364 A1  12/2020  Willers et al.
2021/0049501 A1  2/2021  Kalabic et al.
2021/0073912 A1  3/2021  Da Silva et al.

OTHER PUBLICATIONS

Li et al., "Dealing with the Unkown: Pessimistic Offline Reinforcement Learning", arXiv preprint arXiv:2111.05440v1, Nov. 10, 2021, https://arxiv.org/abs/2111.05440v1, Accessed Apr. 16, 2025 (Year: 2021).*
Office Action from TW 111133127 dated Jul. 26, 2023. (4 pages).
Mell et al., "The NIST Definition of Cloud Computing", National Institute of Standards and Technology, Special Publication 800-145. Sep. 2011, pp. 1-7.
Le, Hoang M., et al. "Batch Policy Learning under Constraints", arXiv:1903.08738v1 [cs.LG]. Mar. 20, 2019, pp. 1-30.
Levine, Sergey, et al. "Offline Reinforcement Learning: Tutorial, Review, and Perspectives on Open Problems", arXiv:2005.01643v3 [cs.LG]. Nov. 1, 2020, pp. 1-43.
Yoo, Haeun, et al. "Reinforcement learning based optimal control of batch processes using Monte-Carlo deep deterministic policy gradient with phase segmentation", Computers & Chemical Engineering. Oct. 2020, pp. 1-11.
Petsagkourakis, Panagiotis, et al. "Chance Constrained Policy Optimization for Process Control and Optimization", arXiv:2008.00030v2 [eess.SY]. Dec. 17, 2020, pp. 1-12.
Buckman, Jacob, et al. "The Importance of Pessimism in Fixed-Dataset Policy Optimization", arXiv:2009.06799v3 [cs.AI]. Nov. 29, 2020, pp. 1-31.
Kumaraswamy, Raksha, et al. "Context-Dependent Upper-Confidence Bounds for Directed Exploration", arXiv preprint arXiv:1811.06629. Nov. 15, 2018, pp. 1-11.
Zhang, Guozhou, et al. "Data-driven optimal energy management for a wind-solar-diesel-battery-reverse osmosis hybrid energy system using a deep reinforcement learning approach", Energy Conversion and Management. Oct. 2020, pp. 1-16.
Urpi, Nuria Armengol, et al. "Risk-Averse Offline Reinforcement Learning", arXiv:2102.05371v1 [cs.LG]. Feb. 10, 2021, pp. 1-17.
International Search Report from PCT/IB2022/058315 dated Dec. 21, 2022. (6 pages).
UK Examination Report (Jul. 2, 20246), issued in corresponding Application No. GB2408456.8, pp. 1-8.
Levine et al., (Nov. 1, 2020), "Offline Reinforcement Learning: Tutorial, Review, and Perspectives on Open Problems", arXiv:2005.01643v3 [cs.LG], pp. 1-43.
Yang et al., (May 24, 2019), "Sample-Optimal Parametric Q-Learning Using Linearly Additive Features", PMLR, pp. 1-10.
Claessens et al., (Oct. 11, 2016), Convolutional Neural Networks for Automatic State-Time Feature Extraction in Reinforcement Learning Applied to Residential Load Control, IEEE Transactions on Smart Grid, pp. 1-12.

* cited by examiner

Algorithm 1 Uncertainty-aware Constrained Offline RL

Require: Dataset $D = \{s, a, s', r, g\}$

1. Learn $\emptyset \leftarrow$ Offline-Feature-Optimization($D$)
2. Initialize $\lambda_1 = [0, 0, \cdots, 0] \in \mathbb{R}^m$
3. for each round $t$ do
4.    Learn $\pi_t, w_t, w_t^r, w_t^g \leftarrow$ Conservative-LSPI($r + \lambda_t^T g$)
5.    Evaluate $\hat{R}(\pi_t) \leftarrow$ Conservative-LSTDQ($w_t^r, r$)
6.    Evaluate $\hat{G}(\pi_t) \leftarrow$ Conservative-LSTDQ($w_t^g, g$)
7.    $\hat{w}_t \leftarrow \frac{1}{t} \Sigma_{t'=1}^{t} w_{t'}$
8.    $\hat{R}(\hat{w}_t) \leftarrow \frac{1}{t} \Sigma_{t'=1}^{t} \hat{R}(w_{t'})$
9.    $\hat{G}(\hat{w}_t) \leftarrow \frac{1}{t} \Sigma_{t'=1}^{t} \hat{G}(w_{t'})$
10.    $\hat{\lambda}_t \leftarrow \frac{1}{t} \Sigma_{t'=1}^{t} \lambda_{t'}$
11.    Learn $\tilde{w} \leftarrow$ Conservative-LSPI($r + \hat{\lambda}_t^T g$)
12.    Evaluate $\hat{R}(\tilde{w}) \leftarrow$ Conservative-LSTDQ($\tilde{w}, r$)
13.    Evaluate $\hat{G}(\tilde{w}) \leftarrow$ Conservative-LSTDQ($\tilde{w}, g$)
14.    $\hat{L}_{\max} = \max_{\lambda, \|\lambda\|_2 \leq B} (\hat{R}(\hat{w}_t) + \lambda^T (\hat{G}(\hat{w}_t) - \tau))$
15.    $\hat{L}_{\min} = \hat{R}(\tilde{w}) + \hat{\lambda}_t^T (\hat{G}(\tilde{w}) - \tau)$
16.    if $\hat{L}_{\max} - \hat{L}_{\min} \leq \omega$ then
17.    Return $\hat{\pi}_t$ greedy w.r.t $\hat{w}_t$(i.e., $\hat{\pi}_t(s) = \text{argmax}_{a \in A} \hat{w}_t^T \emptyset(s, a) \forall_s$)
18.    end if
19.    $\lambda_{t+1} = P(\lambda_t - \eta(\hat{G}(\pi_t) - \tau))$ where projection $P(\lambda) = B \frac{\lambda}{\max\{B, \|\lambda\|_2\}}$
20. end for
    Output: $\pi$

FIG. 9

STEPWISE UNCERTAINTY-AWARE OFFLINE REINFORCEMENT LEARNING UNDER CONSTRAINTS

BACKGROUND

The present invention generally relates to artificial intelligence, and more particularly to stepwise uncertainty-aware offline reinforcement learning under constraints.

Previous approaches such as conventional offline RL, offline RL under side constraints, and risk-sensitive offline RL suffer from various challenges.

For example, regarding conventional offline RL, most of the previous studies on offline RL cannot consider constraints. In other words, they can only deal with single metric (i.e., reward).

Regarding offline RL under side constraints, it is well known that conventional online RL algorithms do not work well in offline RL settings due to the distribution shift.

Regarding risk-sensitive offline RL, this problem setting allows us to incorporate distributions of the value function. However, it is difficult to incorporate side constraint(s).

Thus, there is a need for an approach for stepwise uncertainty-aware offline reinforcement learning under constraints, preferably multiple constraints.

SUMMARY

According to aspects of the present invention, a computer-implemented method is provided for offline reinforcement learning with a dataset. The method includes training a neural network which inputs a state-action pair and outputs a respective Q function for each of a reward and one or more safety constraints, respectively. The neural network has a linear output layer and remaining non-linear layers being represented by a feature mapping function. The training includes obtaining the feature mapping function by constructing Q-functions based on the dataset according to an offline reinforcement algorithm. The training further includes tuning, using the feature mapping function, a weight between the reward and the one or more safety constraints, wherein during the obtaining and the tuning steps, an estimate of a Q-function is provided by subtracting an uncertainty from an expected value of the Q-function. The uncertainty is a function to map the state-action pair to an error size.

According to other aspects of the present invention, a computer program product is provided for offline reinforcement learning with a dataset. The computer program product includes a non-transitory computer readable storage medium having program instructions embodied therewith. The program instructions are executable by a computer to cause the computer to perform a method. The method includes training, by a processor device of the computer, a neural network which inputs a state-action pair and outputs a respective Q function for each of a reward and one or more safety constraints, respectively. The neural network has a linear output layer and remaining non-linear layers being represented by a feature mapping function. The training includes obtaining the feature mapping function by constructing Q-functions based on the dataset according to an offline reinforcement algorithm. The training further includes tuning, using the feature mapping function, a weight between the reward and the one or more safety constraints, wherein during the obtaining and the tuning steps, an estimate of a Q-function is provided by subtracting an uncertainty from an expected value of the Q-function. The uncertainty is a function to map the state-action pair to an error size.

According to yet other aspects of the present invention, a computer processing system is provided for offline reinforcement learning with a dataset. The computer processing system incudes a memory device for storing program code. The computer processing system further includes a processor device operatively coupled to the memory device for running the program code to train a neural network which inputs a state-action pair and outputs a respective Q function for each of a reward and one or more safety constraints, respectively. The neural network has a linear output layer and remaining non-linear layers being represented by a feature mapping function. The training includes the processor device obtaining the feature mapping function by constructing Q-functions based on the dataset according to an offline reinforcement algorithm. The training includes the processor device tuning, using the feature mapping function, a weight between the reward and the one or more safety constraints. During the obtaining and the tuning, an estimate of a Q-function is provided by subtracting an uncertainty from an expected value of the Q-function. The uncertainty is a function to map the state-action pair to an error size.

According to further aspects of the present invention, a computer-implemented method is provided for offline reinforcement learning with a dataset. The method includes training, using uncertainty-aware reinforcement learning algorithm, a neural network which inputs a state-action pair and outputs a respective Q function for each of a reward and one or more safety constraints, respectively. The neural network has a linear output layer and remaining non-linear layers being represented by a feature mapping function. The training includes obtaining the feature mapping function by constructing Q-functions based on the dataset according to an offline reinforcement algorithm. The training further includes tuning, using the feature mapping function, a weight between the reward and the one or more safety constraints, wherein during the obtaining and the tuning steps, an estimate of a Q-function is provided by subtracting an uncertainty from an expected value of the Q-function. The uncertainty is a function to map the state-action pair to an error size. A Lagrangian multiplier is used to tune weights for the reward and the one or more safety constraints.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 9 is a diagram showing exemplary pseudocode for uncertainty-aware constrained offline reinforcement learning, in accordance with an embodiment of the present invention;

DETAILED DESCRIPTION

Embodiments of the present invention are directed to stepwise uncertainty-aware offline reinforcement learning under constraints.

It is known that in offline RL, conventional RL algorithms focusing on expected value do not work well due to the distribution shift. Hence, embodiments of the present invention pessimistically/conservatively estimate the (action) value function. A pessimistic/conservative estimate overcomes the aforementioned distribution shift problem by penalizing out-of-distribution states and actions. In particular, the estimate is made to be pessimistic/conservative by calculating an uncertainty quantifier and subtracting the uncertainty quantifier from the expected value. That is, conservative Q=estimated mean Q−uncertainty term. The conservative Q is a lower-bound of the estimated Q.

Embodiments of the present invention can involve training a feature mapping function using any uncertainty-aware, offline RL algorithm. Embodiments of the present invention can involve optimization of a weight coefficient using uncertainty-aware least-square methods during the training. In accordance with such embodiments, uncertainty-aware reinforcement learning algorithms are used for the training and weight optimization. An uncertainty-aware reinforcement learning algorithm, as compared to lacking the uncertainty-aware, could train a policy from a dataset with partial data coverage.

Figure 1:
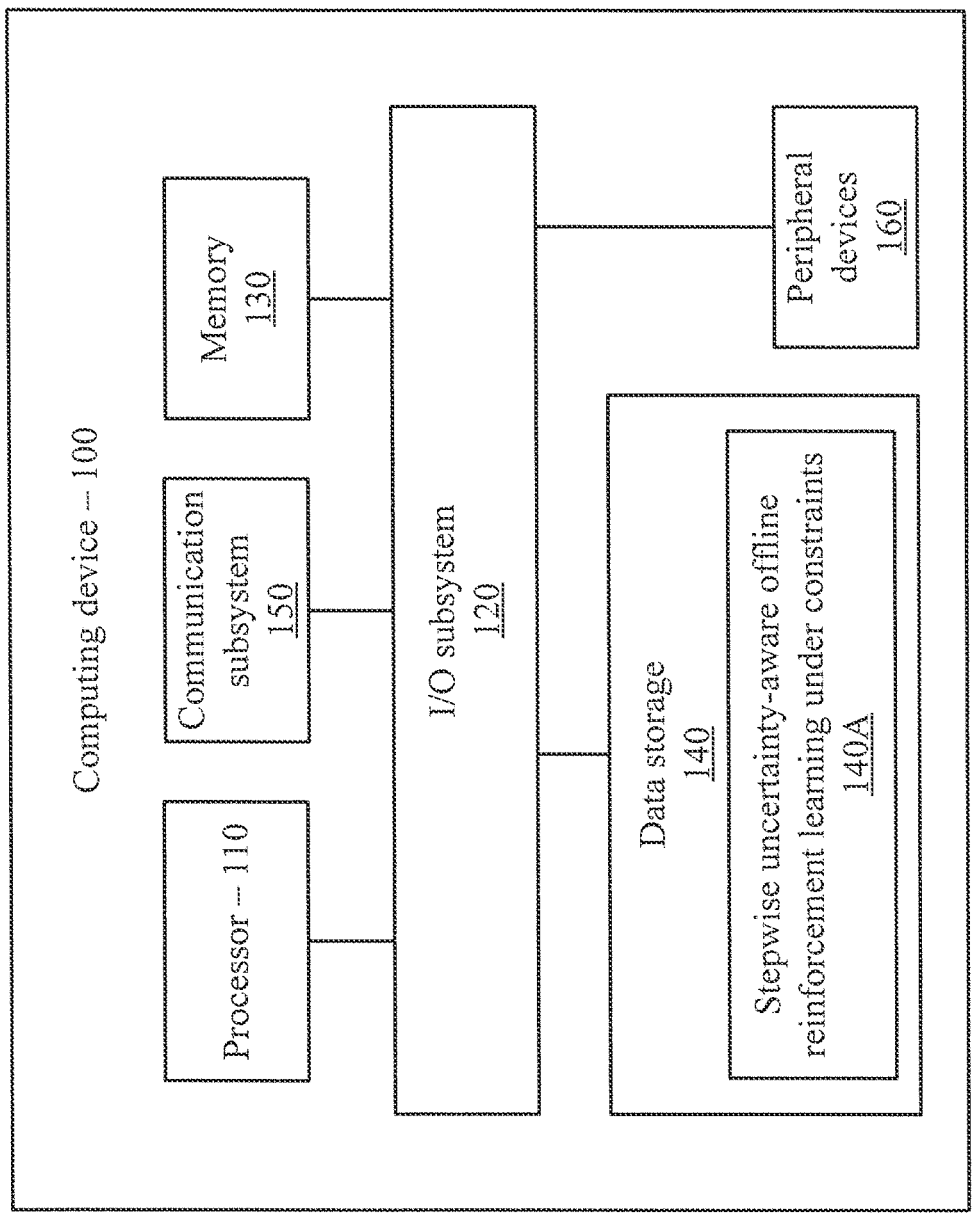
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform stepwise uncertainty-aware offline reinforcement learning under constraints.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for stepwise uncertainty-aware offline reinforcement learning under constraints. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 9-10). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention Definitions A CMDP M=<S, A, T, r, g, γ, χ>
S, A: state and action spaces
T: transition probability
r: reward function
g: safety function
γ: discount factor
χ: initial states distribution
π: policy In constrained Offline RL problems, an agent needs to learn a policy from a dataset Dataset $D=\{(s,a,r,g,s')\}$ In accordance with one or more embodiments of the present invention, value functions can include the following:

Reward: $V_\pi^r(x) := \mathbb{E}[\sum_{t=0}^\infty \gamma^t r(x_t, a_t) | \pi, x_0 = x]$ Safety: $V_\pi^{g_i}(x) := \mathbb{E}[\sum_{t=0}^\infty \gamma^t g_i(x_t, a_t) | \pi, x_0 = x], \forall i = [1,m]$ In an embodiment, a goal of the present invention is as follows:

maximize$_{\pi \in \Pi} V^r(\pi)$ s.t. $V^G(\pi) \geq \tau$ where $V^G(\cdot) = [V^{g_1}(\cdot), \ldots, V^{g_m}(\cdot)]^T$ and $\tau \in \mathbb{R}^m$.

Note: $V^r(\pi)$ and $V^G(\pi)$ are expectations over χ.

A description will now be given regarding intuitions relating to the present invention, in accordance with one or more embodiments of the present invention.

As one intuition, there should be a common feature mapping function φ: S×A→$R^d$, which has a linear relationship with $Q^r$ and $Q^g$.

Figure 2:
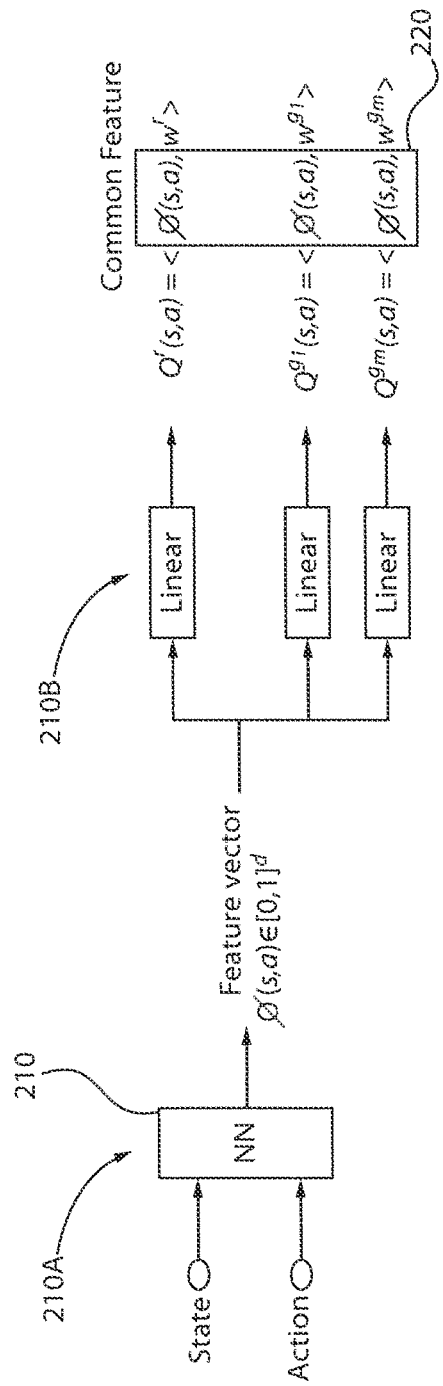
FIG. 2 is a block diagram showing an exemplary system, in accordance with an embodiment of the present invention.

FIG. 2 is a block diagram showing an exemplary system 200, in accordance with an embodiment of the present invention.

The system 200 includes a neural network 210.

The neural network 210 takes a state-action pair as input.

The neural network 210 outputs a feature vector to which a feature mapping function φ: S×A→$R^d$ is applied such that φ(s, a)∈[0, 1]$^d$.

The neural network 210 includes a linear output layer 210B (shown externally for the sake of illustration) and further internally includes multiple non-linear layers 210A.

The neural network 210 outputs a respective Q function for each of a reward and one or more safety constraints. Exemplary Q functions include a reward Q function and 2 safety Q functions as follows:

$Q^r(s,a) = <\phi(s,a), w^r>;$ $Q^{g_1}(s,a) = <\phi(s,a), w^{g_1}>;$ and $Q^{g_m}(s,a) = <\phi(s,a), w^{g_m}>$ As is evident from the preceding, a common feature 220 of all the Q functions is: φ(s, a). The significance of the common feature 220 is to efficiently represent the uncertainties of each Q-function.

Figure 3:
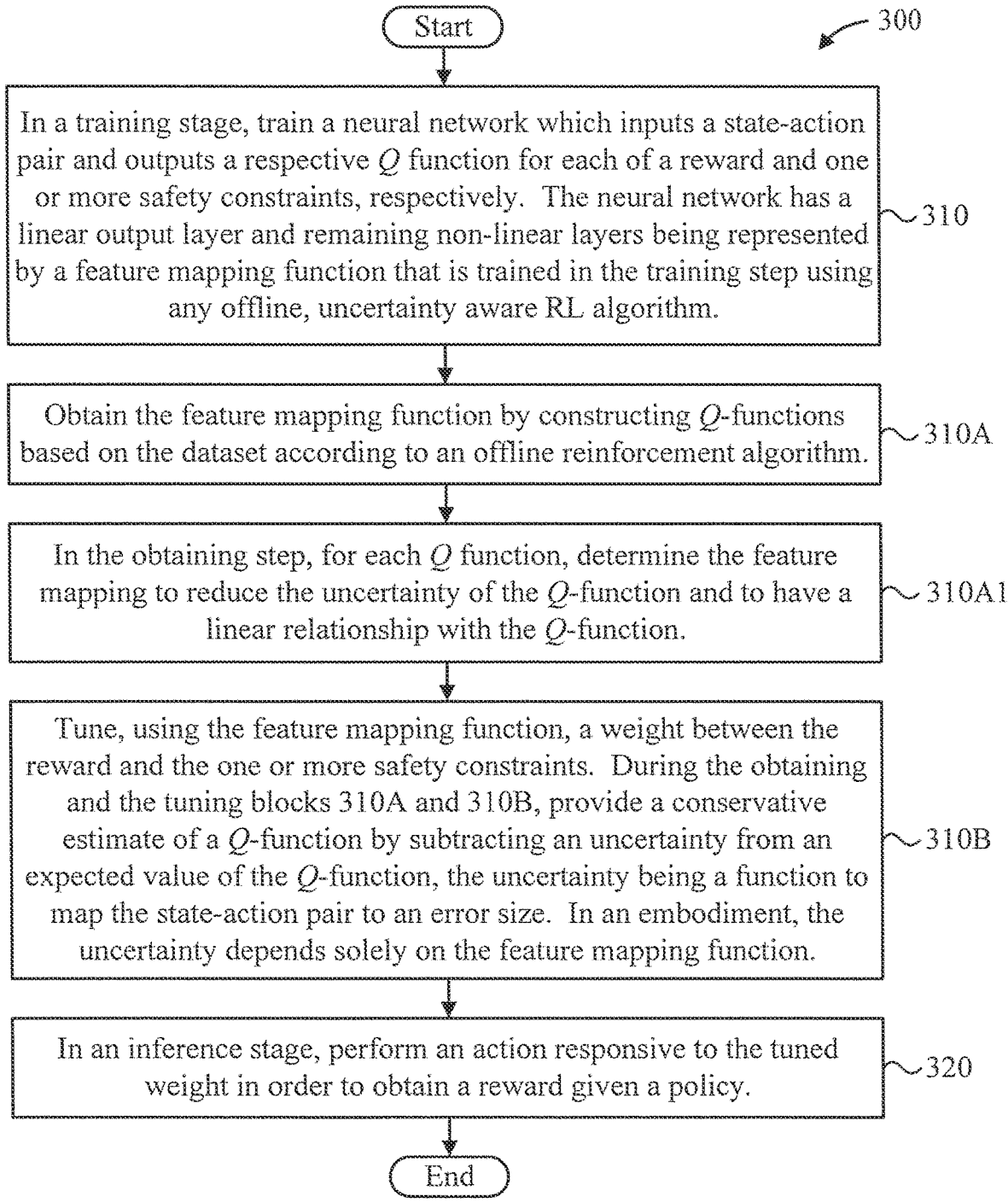
FIG. 3 is a flow diagram showing an exemplary method for offline reinforcement learning with a dataset, in accordance with an embodiment of the present invention.

FIG. 3 is a flow diagram showing an exemplary method 300 for offline reinforcement learning with a dataset, in accordance with an embodiment of the present invention.

At block 310, in a training stage, train a neural network which inputs a state-action pair and outputs a respective Q function for each of a reward and one or more safety constraints, respectively. The neural network has a linear output layer and remaining non-linear layers being represented by a feature mapping function that is trained in the training step using any offline, uncertainty aware RL algorithm. An offline uncertainty-aware RL algorithm can be any existing deep RL algorithm. The feature mapping function maps the non-linear layers to the linear output layer.

In an embodiment, block 310 can include one or more of blocks 310A and 310B.

At block 310A, obtain the feature mapping function by constructing Q-functions based on the dataset according to an offline reinforcement algorithm. Feature mapping function is obtained by extracting the neural network except for the last linear layer. That is, we now have a function modeled by a neural network to map from state-action pairs a to d-dimensional vector, which is linear with respect to Q-functions.

In an embodiment, block 310A can include 310A1.

At block 310A1, in the obtaining step, for each Q function, determine the feature mapping to reduce the uncertainty of the Q-function and to have a linear relationship with the Q-function. Since it is known that smaller feature dimension leads to smaller uncertainty, we search the optimal feature mapping function with respect to feature dimension.

At block 310B, tune, using the feature mapping function, a weight between the reward and the one or more safety constraints. The tuning is done is to achieve the goal of obtaining a feature mapping function with small feature dimension, which is linear with respect to Q-functions. During the obtaining and the tuning blocks 310A and 310B, provide a conservative estimate of a Q-function by subtracting an uncertainty from an expected value of the Q-function, the uncertainty being a function to map the state-action pair to an error size. In an embodiment, the uncertainty depends solely on the feature mapping function.

Further regarding the error size, uncertainty is the function to measure how large the error is. Specifically, let us denote the following:
Q*: true Q-function
Q: estimated Q-function
U: uncertainty.
Then, uncertainty function satisfies |Q*−Q|<U.

At block 320, in an inference stage, perform an action responsive to the tuned weight in order to obtain a reward given a policy.

Upon performing block 310 of the method 300 of FIG. 3, the reinforcement learning system, in particular neural network 210, is now considered trained and can be used for an inference stage in block 320 where the agent is deployed in the environment to perform an action. The action can be such as to satisfy the safety constraints while performing a useful action to obtain a reward. The reward can be suboptimal in a sequence of rewards corresponding to a sequence of actions including sub-optimal actions leading to an optimal action and corresponding optimal reward Exemplary actions include, but are not limited to, moving a robotic, lifting an item by a robot, moving an item by a robot from point A to point B, controlling the trajectory of a vehicle via its Advanced a driver Assistance System (ADAS) (e.g., for accident avoidance).

In an ADAS environment, each vehicle system (e.g., steering, braking, accelerating, warning lighting, etc.,) can be considered an agent where agent collaboration results in the performing of several actions, possibly simultaneously, such as steering (e.g., away) and/or braking to avoid an impending collision and/or accelerating to be past a potential point of collision.

These and other actions and exemplary scenarios to which the present invention can be applied are readily contemplated by one of ordinary skill in the art while maintaining the spirit of the present invention.

A description will now be given regarding how to obtain feature mapping function ϕ, in accordance with an embodiment of the present invention.

In general, feature mapping function ϕ is non-linear. In an embodiment, the feature mapping function ϕ is a Neural Network-based function approximator.

Obtain the feature mapping function ϕ by constructing the Q-functions (critics) whose final layer is linear.

Total Critic loss=(Critic loss for $Q^r$)+λ·(Critic loss for $Q^g$), where λ denotes a Lagrangian multiplier to tune the weights of reward and safety.

Figure 4:
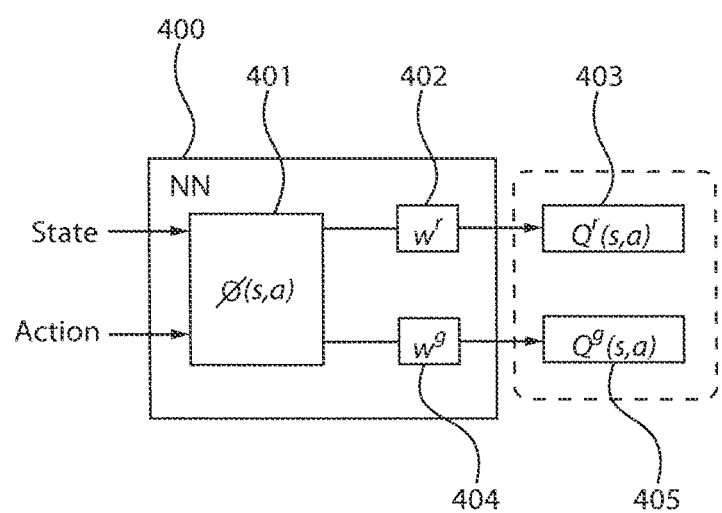
FIG. 4 is a block diagram showing an exemplary neural network, in accordance with an embodiment of the present invention.

FIG. 4 is a block diagram showing an exemplary neural network 400, in accordance with an embodiment of the present invention.

The neural network 400 takes in a state-action pair as input for a feature mapping function ϕ(s, a) 401.

A weight $w^r$ 402 is tuned between the feature mapping function ϕ 401 and reward Q-function $Q^r$(s, a) 403. A weight $w^g$ 404 is tuned between the feature mapping function ϕ 401 and reward Q-function $Q^g$(s, a) 405.

A description will now be given regarding what is a good and/or otherwise acceptable feature mapping function ϕ, in accordance with an embodiment of the present invention.

The feature mapping function ϕ should enjoy linearity with respect to Q-functions.

The feature mapping function ϕ estimates the uncertainty of Q-functions tightly (due to the importance of pessimism in offline RL). In particular, pessimism is importance in offline RL because the real dataset does not fully cover the whole state and action spaces in most cases.

Figure 5:
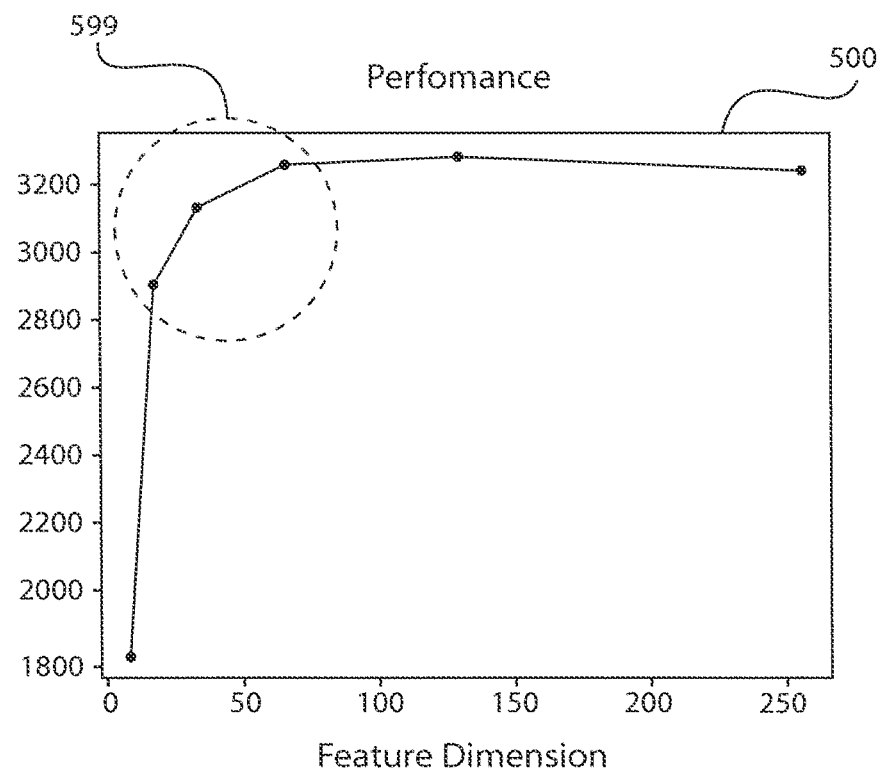
FIG. 5 is a diagram showing a plot of feature dimension versus performance, in accordance with an embodiment of the present invention.

FIG. 5 is a diagram showing a plot 500 of feature dimension versus performance, in accordance with an embodiment of the present invention.

In the plot 500, feature dimension is represented on the x-axis, and performance is represented on the y-axis.

Here dimensions yielding good performance are identified. Performance units can be, for example, reward (i.e., how much utility a policy achieved) and safety (i.e., how much a policy satisfy the constraints). Implicated dimensions in FIG. 5 include 16, 32, and 64, as shown in circle 599. These are selected because they are commonly used dimensions in RL literatures.

Figure 6:
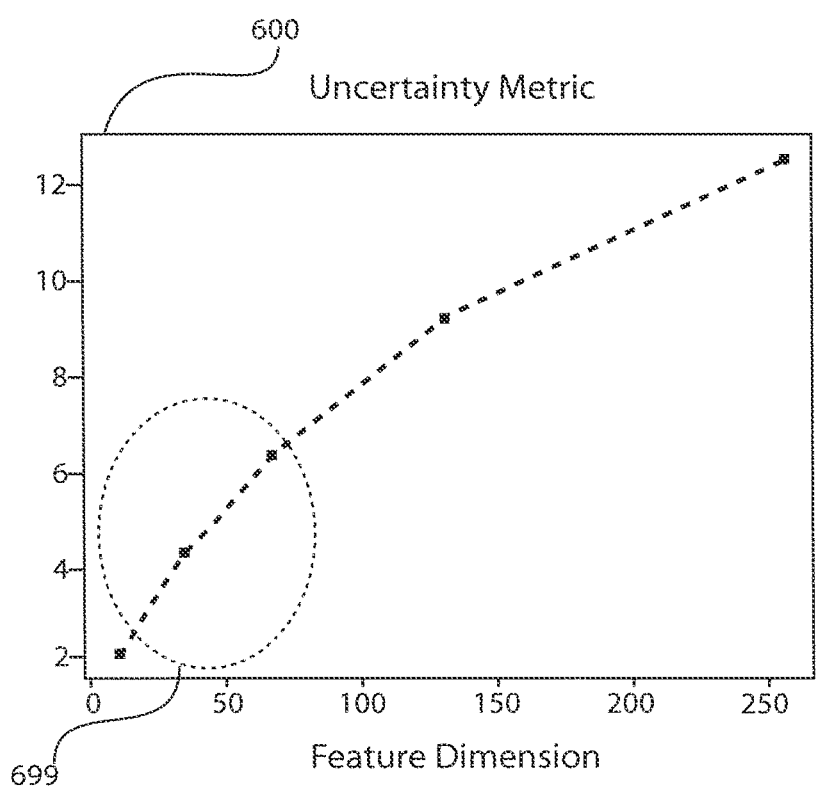
FIG. 6 is a diagram showing a plot of feature dimension versus uncertainty metric, in accordance with an embodiment of the present invention.

FIG. 6 is a diagram showing a plot 600 of feature dimension versus uncertainty metric, in accordance with an embodiment of the present invention.

In the plot, feature dimension is represented on the x-axis, and an uncertainty metric is represented on the y-axis. Dimensions 16, 32, and 64 are in circle 699.

Regarding the Uncertainty Metric:

$$\mathbb{E}_{s,a\sim D} \mathcal{F}_{\phi(s,a)} \leq C_1 \sqrt{d}$$

where s is state, a is action, D is dataset, $C_1$ is positive constant, and d is feature dimension.

A description will now be given regarding what is important for finding a good and/or otherwise acceptable feature mapping function ϕ, in accordance with an embodiment of the present invention.

The feature dimension should be tuned carefully in order to ensure that the Q-function is linear with respect to the feature mapping function and uncertainty is measured tightly. The optimal feature vector should be found such that a conservative estimate of Q is large.

Figure 7:
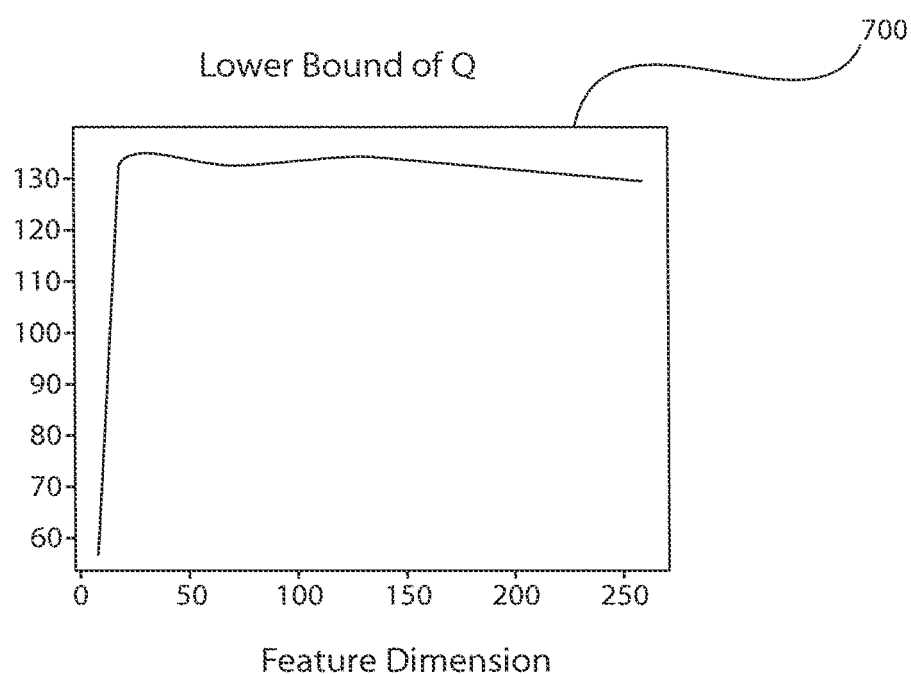
FIG. 7 is a diagram showing a plot of feature dimension versus a lower bound of Q, in accordance with an embodiment of the present invention.

FIG. 7 is a diagram showing a plot 700 of feature dimension versus a lower bound of Q, in accordance with an embodiment of the present invention.

In plot 700, feature dimension is represented on the x-axis, and a lower bound of Q is represented on the y-axis.

Here, d=32 is the optimal dimension because the conservative estimate of Q-function is largest; that is, expected Q values are large and uncertainty term is small.

A description will now be given regarding tuning the weight between reward and safety, in accordance with an embodiment of the present invention.

Once a feature mapping function becomes available, what we need to do is to optimize the λ parameter. λ denotes a Lagrangian multiplier to tune the weights of reward and safety.

We can use, for example, but not limited to, the Least Squares Policy Iteration (LSPI) or the Least Squares Temporal Difference Q (LSTDQ) algorithm.

$$Q^{r+\lambda^T g}(s, a) = \sum_{k=0}^{\infty} \gamma^t (r + \lambda^T g)(s, a)$$

$$= \sum_{k=0}^{\infty} \gamma^t r(s, a) + \lambda^T \sum_{k=0}^{\infty} \gamma^t g(s, a)$$

$$= Q^r(s, a) + \lambda^T Q^g(s, a)$$

$$= \langle w^r, \phi(s, a) \rangle + \lambda^T \langle w^g, \phi(s, a) \rangle$$

$$= \langle w^r + \lambda^T w^g, \phi(s, a) \rangle$$

where $\gamma$ is a discount factor, $\lambda$ is a Lagrangian multiplier, $w^r$ is the weight for reward, and $w^g$ is the weight for safety.

A description will now be given regarding conservative LSPI and LSTDQ algorithms, in accordance with an embodiment of the present invention.

Original LSPI and LSTDQ only consider expected values.

In offline RL settings, pessimism is important.

Embodiments of the present invention introduce conservative version of LSPI and LSTDQ.

$$\pi(s) = \operatorname{argmax}_a \{\langle w, \phi(s,a) \rangle - \mathcal{F}_\phi(s,a)\}$$

$\mathcal{F}_\phi(s, a)$ is a function to map a state-action pair to uncertainty, and w is the tuned weight. This function depends solely on $\phi$.

Upon performing the method 400 of FIG. 4, the reinforcement learning system, in particular neural network 210, is now considered trained and can be used for an inference stage where the agent is deployed in the environment to perform an action. The action can be such as to satisfy the safety constraints while performing a useful action to obtain a reward. The reward can be suboptimal in a sequence of rewards corresponding to a sequence of actions including sub-optimal actions leading to an optimal action and corresponding optimal reward.

Exemplary actions include, but are not limited to, moving a robotic, lifting an item by a robot, moving an item by a robot from point A to point B, controlling the trajectory of a vehicle via its Advanced a driver Assistance System (ADAS) (e.g., for accident avoidance).

In an ADAS environment, each vehicle system (e.g., steering, braking, accelerating, warning lighting, etc.,) can be considered an agent where agent collaboration results in the performing of several actions, possibly simultaneously, such as steering (e.g., away) and/or braking to avoid an impending collision and/or accelerating to be past a potential point of collision.

These and other actions and exemplary scenarios to which the present invention can be applied are readily contemplated by one of ordinary skill in the art while maintaining the spirit of the present invention.

Figure 8:
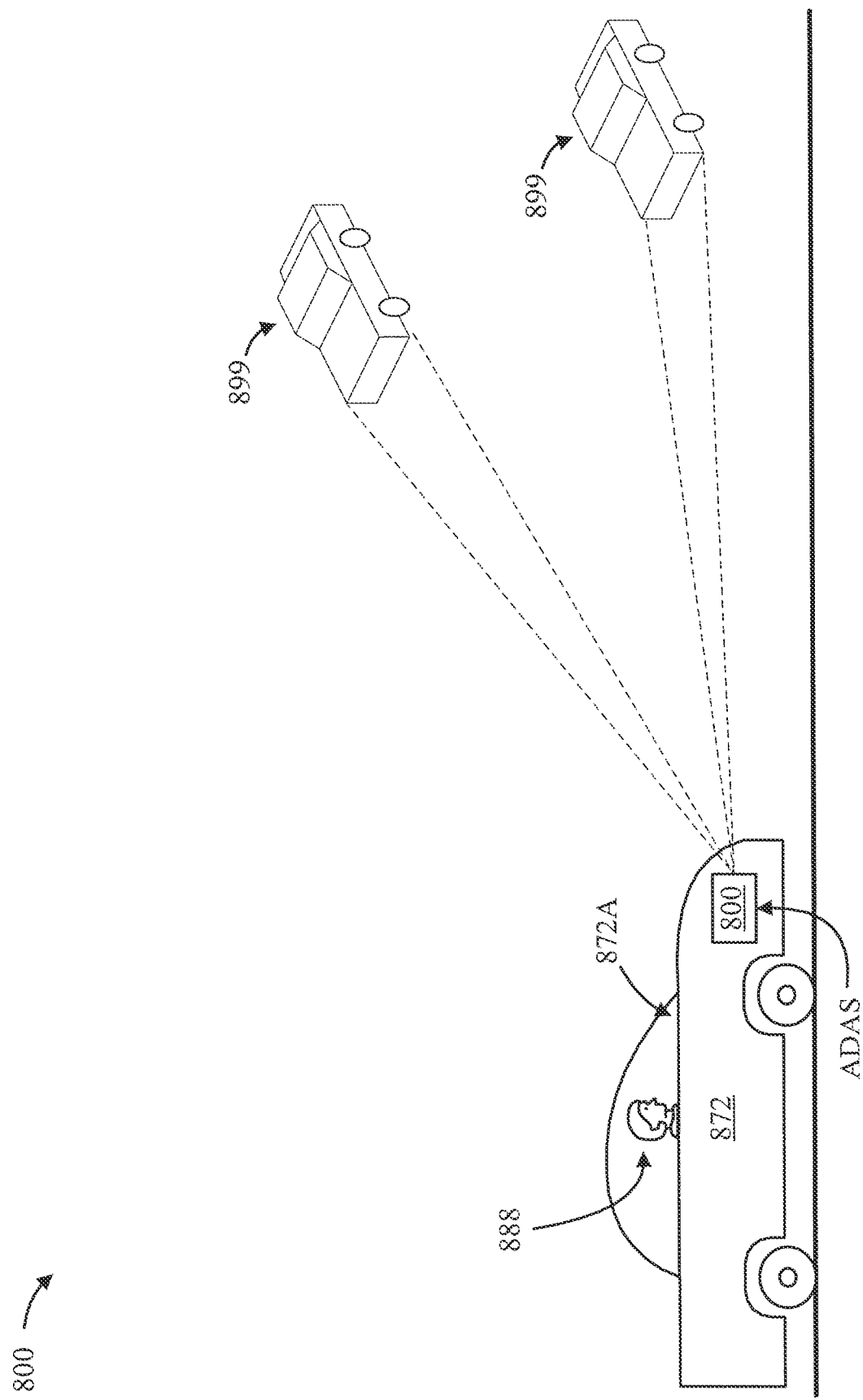
FIG. 8 is a block diagram showing an exemplary environment to which the present invention can be applied, in accordance with an embodiment of the present invention.

FIG. 8 is a block diagram showing an exemplary environment 810 to which the present invention can be applied, in accordance with an embodiment of the present invention.

In the environment 810, a user 888 is located in a scene with multiple objects 899, each having their own locations and trajectories. The user 888 is operating a vehicle 872 (e.g., a car, a truck, a motorcycle, etc.) having an ADAS 877.

The ADAS 877 trains a neural network to input state-action pairs and output respective Q functions for a reward and one or more safety constraints. The trained neural network is then used at an inference stage to make decisions regarding vehicle control responsive to a given situation (upcoming object collision, side swipe collision, pedestrians approaching, etc.).

Responsive to the policy $\pi$, a vehicle controlling decision is made. To that end, the ADAS 877 can control, as an action corresponding to a decision, for example, but not limited to, steering, braking, lighting, tire pressure management (TPM), and accelerating systems.

Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 800) may interface with the user through one or more systems of the vehicle 872 that the user is operating. For example, the system of the present invention can provide the user information through a system 872A (e.g., a display system, a speaker system, and/or some other system) of the vehicle 872. Moreover, the system of the present invention (e.g., system 800) may interface with the vehicle 872 itself (e.g., through one or more systems of the vehicle 872 including, but not limited to, a steering system, a braking system, an acceleration system, a steering system, a lighting (turn signals, headlamps) system, etc.) in order to control the vehicle and cause the vehicle 872 to perform one or more actions. In this way, the user or the vehicle 872 itself can navigate around these objects 899 to avoid potential collisions there between. The providing of information and/or the controlling of the vehicle can be considered actions that are determined in accordance with embodiments of the present invention.

Thus, in an autonomous driving application, state can be, for example, but not limited to, position, velocity, etc. Action can be, for example, but not limited to, steering angle, throttle, brake, etc. Reward can be, for example, but not limited to, gas consumption, accident avoidance, etc. Safety can be, for example, but not limited to, a violation of a traffic rule, a traffic accident, etc.

In a robot manipulation application, the state can be, but is not limited to, position, angle of joints, etc. Action can be, but is not limited to, torque of motors. Reward can be, but is not limited to, arrival at the goal. Safety can be, but is not limited to, collision with objects, etc.

FIG. 9 is a diagram showing exemplary pseudocode 900 for uncertainty-aware constrained offline reinforcement learning, in accordance with an embodiment of the present invention.

The pseudocode 900 is for Algorithm 1, which inputs a dataset D including a state-action pair (s, a), a next state (s'), a reward (r), and a safety constraint (g).

The algorithm 900 outputs a policy $\pi$.

It is to be appreciated that one or more embodiments of the present invention can be implemented at least partly in the cloud. For example, for a two stage scenario including a training stage and an inference stage, the training stage can be performed in the cloud, with a trained model offloaded to another device (e.g., an ADAS, a robot, etc.) for inference when desired. These and other variations of the present invention are readily contemplated by one of ordinary skill in the art, given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
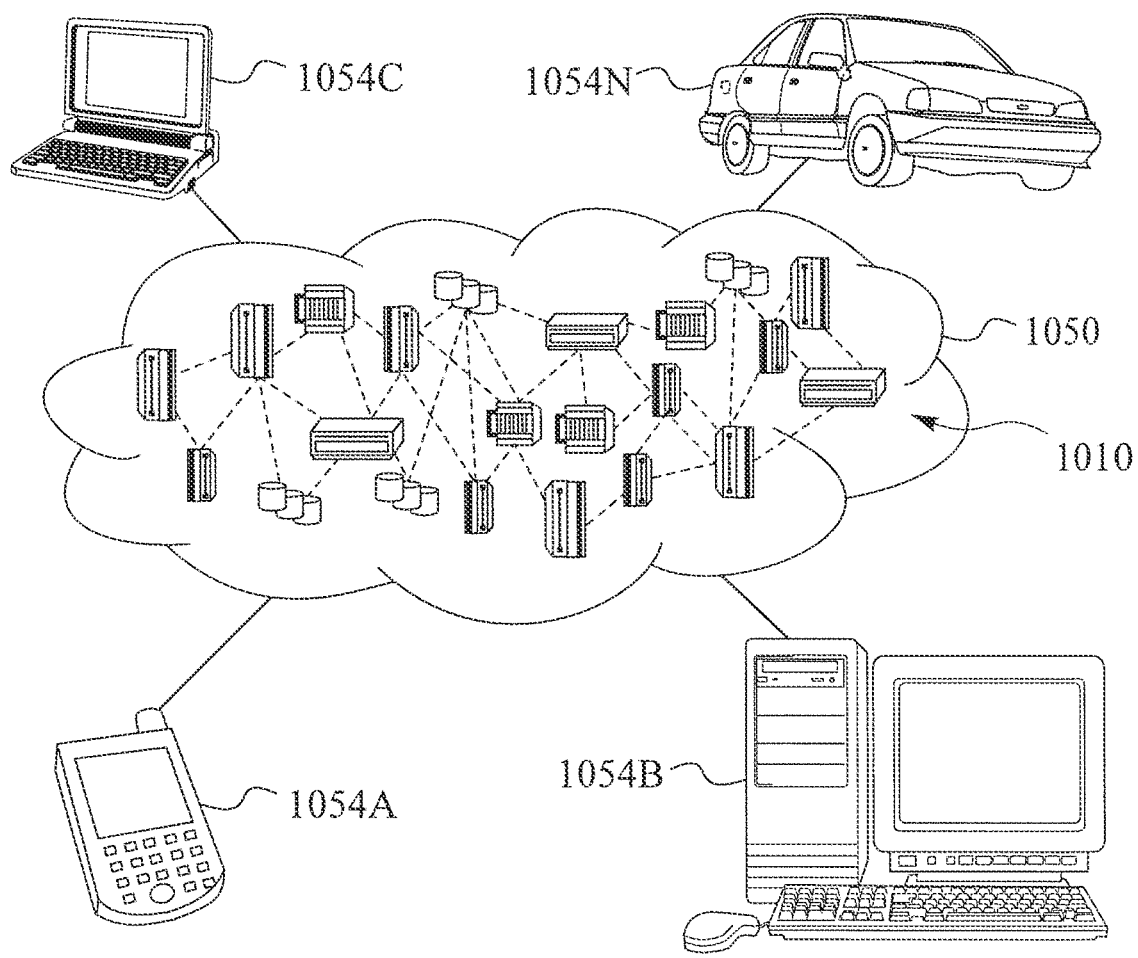
FIG. 10 is a block diagram showing an illustrative cloud computing environment having one or more cloud computing nodes with which local computing devices used by cloud consumers communicate, in accordance with an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
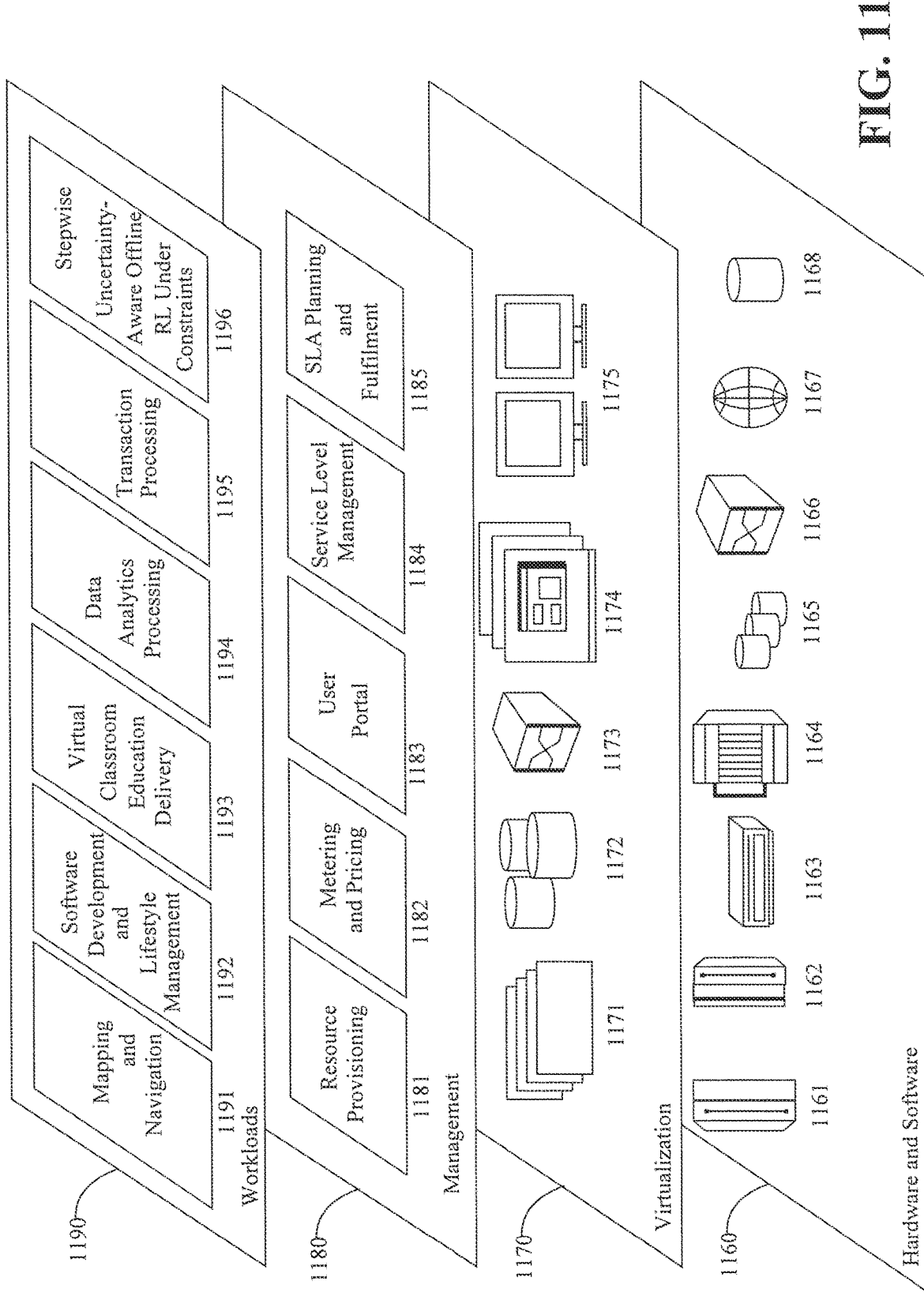
FIG. 11 is a block diagram showing a set of functional abstraction layers provided by a cloud computing environment, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172;

virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and stepwise uncertainty-aware offline reinforcement learning under constraints 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for offline reinforcement learning with a dataset, comprising:
training a neural network which inputs a state-action pair and outputs a respective Q function for each of a reward and one or more safety constraints, respectively, the neural network having a linear output layer and remaining non-linear layers being represented by a feature mapping function, to obtain a trained neural network that overcomes a distribution shift and incorporates side constraints with offline reinforcement learning,
wherein the training includes:
obtaining the feature mapping function by constructing Q-functions based on the dataset according to an offline reinforcement algorithm; and
tuning, using the feature mapping function, a weight between the reward and the one or more safety constraints, wherein during the obtaining and the tuning steps, an estimate of a Q-function is provided by subtracting an uncertainty from an expected value of the Q-function, the uncertainty being a function to map the state-action pair to an error size.

2. The computer-implemented method of claim 1, wherein the uncertainty depends solely on the feature mapping function.

3. The computer-implemented method of claim 1, wherein in the obtaining step, the feature mapping is determined to reduce the uncertainty of the Q-function and to have a linear relationship with the Q-function.

4. The computer-implemented method of claim 1, wherein the remaining non-linear layers are internal to the neural network.

5. The computer-implemented method of claim 1, wherein said training step trains the neural network using an uncertainty-aware reinforcement learning algorithm.

6. The computer-implemented method of claim 1, wherein the method is performed by an Advanced Driver Assistance System that uses the tuned weight to control a vehicle system.

7. The computer-implemented method of claim 1, wherein the method is performed by a robotic that uses the tuned weight to perform a next action.

8. The computer-implemented method of claim 1, wherein a Lagrangian multiplier is used to tune weights for the reward.

9. The computer-implemented method of claim 1, wherein a Lagrangian multiplier is used to tune weights for the one or more safety constraints.

10. A computer program product for offline reinforcement learning with a dataset, the computer program product comprising a non-transitory computer readable storage medium having program instructions embodied therewith, the program instructions executable by a computer to cause the computer to perform a method comprising:
training, by a processor device of the computer, a neural network which inputs a state-action pair and outputs a respective Q function for each of a reward and one or more safety constraints, respectively, the neural network having a linear output layer and remaining non-linear layers being represented by a feature mapping function, to obtain a trained neural network that overcomes a distribution shift and incorporates side constraints with offline reinforcement learning,
wherein the training includes:
obtaining the feature mapping function by constructing Q-functions based on the dataset according to an offline reinforcement algorithm; and
tuning, using the feature mapping function, a weight between the reward and the one or more safety constraints, wherein during the obtaining and the tuning steps, an estimate of a Q-function is provided by subtracting an uncertainty from an expected value of the Q-function, the uncertainty being a function to map the state-action pair to an error size.

11. The computer program product of claim 10, wherein the uncertainty depends solely on the feature mapping function.

12. The computer program product of claim 10, wherein in the obtaining step, the feature mapping is determined to reduce the uncertainty of the Q-function and to have a linear relationship with the Q-function.

13. The computer program product of claim 10, wherein the remaining non-linear layers are internal to the neural network.

14. The computer program product of claim 10, wherein said training step trains the neural network using a uncertainty-aware reinforcement learning algorithm.

15. The computer program product of claim 10, wherein the method is performed by an Advanced Driver Assistance System that uses the tuned weight to control a vehicle system.

16. The computer program product of claim 10, wherein the method is performed by a robotic that uses the tuned weight to perform a next action.

17. The computer program product of claim 10, wherein a Lagrangian multiplier is used to tune weights for the reward.

18. The computer program product of claim 10, wherein a Lagrangian multiplier is used to tune weights for the one or more safety constraints.

19. A computer processing system for offline reinforcement learning with a dataset, comprising:
   a memory device for storing program code; and
   a processor device operatively coupled to the memory device for running the program code to:
      train a neural network which inputs a state-action pair and outputs a respective Q function for each of a reward and one or more safety constraints, respectively, the neural network having a linear output layer and remaining non-linear layers being represented by a feature mapping function, to obtain a trained neural network that overcomes a distribution shift and incorporates side constraints with offline reinforcement learning,
   wherein the training includes:
      the processor device obtaining the feature mapping function by constructing Q-functions based on the dataset according to an offline reinforcement algorithm; and
      the processor device tuning, using the feature mapping function, a weight between the reward and the one or more safety constraints, wherein during the obtaining and the tuning, an estimate of a Q-function is provided by subtracting an uncertainty from an expected value of the Q-function, the uncertainty being a function to map the state-action pair to an error size.

20. The computer processing system of claim 19, wherein the uncertainty depends solely on the feature mapping function.

21. The computer processing system of claim 19, wherein in the obtaining step, the feature mapping is determined to reduce the uncertainty of the Q-function and to have a linear relationship with the Q-function.

22. The computer processing system of claim 19, wherein the remaining non-linear layers are internal to the neural network.

23. The computer processing system of claim 19, wherein said training step trains the neural network using a uncertainty-aware reinforcement learning algorithm.

24. The computer processing system of claim 19, wherein the method is performed by an Advanced Driver Assistance System that uses the tuned weight to control a vehicle system.

25. A computer-implemented method for offline reinforcement learning with a dataset, comprising:
   training, using uncertainty-aware reinforcement learning algorithm, a neural network which inputs a state-action pair and outputs a respective Q function for each of a reward and one or more safety constraints, respectively, the neural network having a linear output layer and remaining non-linear layers being represented by a feature mapping function, to obtain a trained neural network that overcomes a distribution shift and incorporates side constraints with offline reinforcement learning,
   wherein the training includes:
      obtaining the feature mapping function by constructing Q-functions based on the dataset according to an offline reinforcement algorithm; and
      tuning, using the feature mapping function, a weight between the reward and the one or more safety constraints, wherein during the obtaining and the tuning steps, an estimate of a Q-function is provided by subtracting an uncertainty from an expected value of the Q-function, the uncertainty being a function to map the state-action pair to an error size,
   wherein a Lagrangian multiplier is used to tune weights for the reward and the one or more safety constraints.

* * * * *